US012415711B2

(12) United States Patent
Yoshida

(10) Patent No.: US 12,415,711 B2
(45) Date of Patent: Sep. 16, 2025

(54) TRANSPORT VEHICLE, CONNECTING PART, DISTANCE SPECIFYING METHOD, AND RECORDING MEDIUM

(71) Applicant: Mitsubishi Logisnext Co., Ltd., Kyoto (JP)

(72) Inventor: Tetsuro Yoshida, Kyoto (JP)

(73) Assignee: Mitsubishi Logisnext Co., Ltd., Kyoto (JP)

( * ) Notice: Subject to any disclaimer, the term of this patent is extended or adjusted under 35 U.S.C. 154(b) by 170 days.

(21) Appl. No.: 18/450,387

(22) Filed: Aug. 15, 2023

(65) Prior Publication Data

US 2024/0327183 A1 Oct. 3, 2024

(30) Foreign Application Priority Data

Mar. 29, 2023 (JP) ................................ 2023-052776

(51) Int. Cl.
*B66F 9/075* (2006.01)
*B66F 9/06* (2006.01)

(52) U.S. Cl.
CPC ........... *B66F 9/0755* (2013.01); *B66F 9/063* (2013.01)

(58) Field of Classification Search
CPC ............................... B66F 9/0755; B66F 9/063
See application file for complete search history.

(56) References Cited

U.S. PATENT DOCUMENTS

| | | | | |
|---|---|---|---|---|
| 10,328,578 | B2 | 6/2019 | Holz | |
| 2021/0276842 | A1 | 9/2021 | Bistry et al. | |
| 2022/0289538 | A1* | 9/2022 | Kawashima | G01S 17/89 |

FOREIGN PATENT DOCUMENTS

| | | | | |
|---|---|---|---|---|
| CN | 113665484 A | * 11/2021 | | |
| CN | 116354274 A | * 6/2023 | | B66F 9/063 |
| JP | 2020030642 | 2/2020 | | |
| JP | 2022125781 | 8/2022 | | |
| KR | 20200012298 A | * 2/2020 | | |
| KR | 20210127075 A | * 10/2021 | | |

OTHER PUBLICATIONS

"Search Report of Europe Counterpart Application", issued on Mar. 15, 2024, p. 1-p. 8.

* cited by examiner

*Primary Examiner* — Diem M Tran
(74) *Attorney, Agent, or Firm* — JCIPRNET

(57) ABSTRACT

A transport vehicle is provided, which is capable of adjusting a cargo loading position afterward even if a mobile shelf, a truck, or the like deviates from a predetermined position. The transport vehicle 1 includes: forks 16; a point group acquisition unit 22 that acquires a point group PG by horizontally irradiating a laser; and a distance specifying unit that specifies a distance in a left-right direction between the cargo loaded on the forks 16 and an object adjacent to a cargo loading position based on the acquired point group PG. The point group acquisition unit 22 is arranged at a position to be capable of irradiating the cargo loaded on the forks 16 and the cargo loading position with a laser.

7 Claims, 12 Drawing Sheets

TRANSPORT VEHICLE, CONNECTING PART, DISTANCE SPECIFYING METHOD, AND RECORDING MEDIUM

CROSS-REFERENCE TO RELATED APPLICATION

This application claims the priority benefits of Japanese application no. 2023-052776, filed on Mar. 29, 2023. The entirety of the above-mentioned patent application is hereby incorporated by reference herein and made a part of this specification.

BACKGROUND

Technical Field

The disclosure relates to a transport vehicle, a connecting part, a distance specifying method, and a distance specifying program.

Description of Related Art

Conventionally, there is an unmanned guided vehicle that autonomously travels and handles cargo, as shown in Patent Literature 1 (Japanese Patent Application Laid-Open No. 2020-030642). The unmanned guided vehicle disclosed in Patent Literature 1 includes forks, an elevating device for raising and lowering the forks, and a laser scanner for detecting the position of the vehicle itself. The unmanned guided vehicle is configured to move to a predetermined cargo handling position while detecting its own position and raise and lower the forks to perform cargo handling work.

As disclosed in Patent Literature 1, the unmanned guided vehicle may perform cargo handling on a mobile shelf. Unlike a fixed shelf, the mobile shelf moves, but the mobile shelf may deviate from a predetermined movement position during the movement. As a result, a deviation occurs between the predetermined cargo handling position and the mobile shelf, but the unmanned transport system of Patent Literature 1 does not take this deviation into consideration. In addition, when cargo handling work is performed on a truck that has stopped at a predetermined position, the truck may still deviate from the predetermined standby position, and in this case, there is also a deviation from the predetermined cargo handling position. If the cargo handling position is determined on the assumption that the mobile shelf or the truck will deviate, there is a problem that the cargo cannot be loaded with the space therebetween closed. In order to solve this problem, it is preferable to adjust the cargo loading position after the unmanned guided vehicle arrives at the predetermined cargo handling position, but it is not easy and difficult to recognize how much the mobile shelf, truck, or the like has deviated from the predetermined position.

SUMMARY

The disclosure provides a transport vehicle that is capable of correcting the cargo loading position afterward even if the mobile shelf, truck, or the like deviates from a predetermined position.

A transport vehicle according to the disclosure includes: a cargo loading unit; a point group acquisition unit that is arranged at a position to be capable of irradiating cargo loaded on the cargo loading unit and a cargo loading position with a laser, and acquires a point group by horizontally irradiating the laser; and a distance specifying unit that specifies a distance in a left-right direction between the cargo loaded on the cargo loading unit and an object adjacent to the cargo loading position based on the acquired point group.

For example, the transport vehicle is a forklift and includes a backrest, and the point group acquisition unit is provided in the backrest.

The transport vehicle preferably includes: a connecting part, and the connecting part is connected to the backrest and the point group acquisition unit, and arranges the point group acquisition unit obliquely behind either a left or right end portion of the backrest in plan view.

In the transport vehicle, preferably, the distance specifying unit further specifies a distance in a front-rear direction between the cargo loaded on the cargo loading unit and the object adjacent to the cargo loading position based on the acquired point group.

A distance specifying method according to the disclosure is for specifying a distance in a left-right direction between cargo loaded on a cargo loading unit of a transport vehicle and an object adjacent to a cargo loading position. The distance specifying method includes: acquiring a point group by horizontally irradiating the cargo loaded on the cargo loading unit and the object adjacent to the cargo loading position with a laser; and specifying the distance in the left-right direction between the cargo loaded on the cargo loading unit and the object adjacent to the cargo loading position based on the acquired point group.

A distance specifying method according to the disclosure is for specifying a distance in a front-rear direction between cargo loaded on a cargo loading unit of a transport vehicle and an object adjacent to a cargo loading position. The distance specifying method includes: acquiring a point group by horizontally irradiating the cargo loaded on the cargo loading unit and the object adjacent to the cargo loading position with a laser; and specifying the distance in the front-rear direction between the cargo loaded on the cargo loading unit and the object adjacent to the cargo loading position based on the acquired point group.

A distance specifying program according to the disclosure is for a computer of a transport vehicle, which includes: a cargo loading unit; a point group acquisition unit that is configured to be capable of horizontally irradiating cargo loaded on the cargo loading unit and a cargo loading position with a laser, and acquires a point group; and the computer, to specify a distance between the cargo loaded on the cargo loading unit and an object adjacent to the cargo loading position based on the acquired point group.

A connecting part according to the disclosure is provided in a transport vehicle which includes: a cargo loading unit; a point group acquisition unit that is configured to be capable of horizontally irradiating cargo loaded on the cargo loading unit and a cargo loading position with a laser, and acquires a point group; a distance specifying unit that specifies a distance in a left-right direction between the cargo loaded on the cargo loading unit and an object adjacent to the cargo loading position based on the acquired point group; and a backrest. The connecting part includes: a first end portion fixed to either a left or right end portion or an upper end of the backrest; an intermediate portion extending obliquely behind the backrest from the first end portion in plan view; and a second end portion continuing from the intermediate portion and supporting the point group acquisition unit.

Since the transport vehicle according to the disclosure is capable of specifying the distance in the left-right direction between the cargo loaded on the cargo loading unit and the object adjacent to the cargo loading position, it is possible to correct the cargo loading position afterward even if the mobile shelf, truck, or the like deviates from the predetermined position.

BRIEF DESCRIPTION OF THE DRAWINGS

FIG. 3A to FIG. 3C show the connecting part, wherein FIG. 3A is a perspective view seen from the front top, FIG. 3B is a plan view, and FIG. 3C is a front view.

DESCRIPTION OF THE EMBODIMENTS

Figure 1:
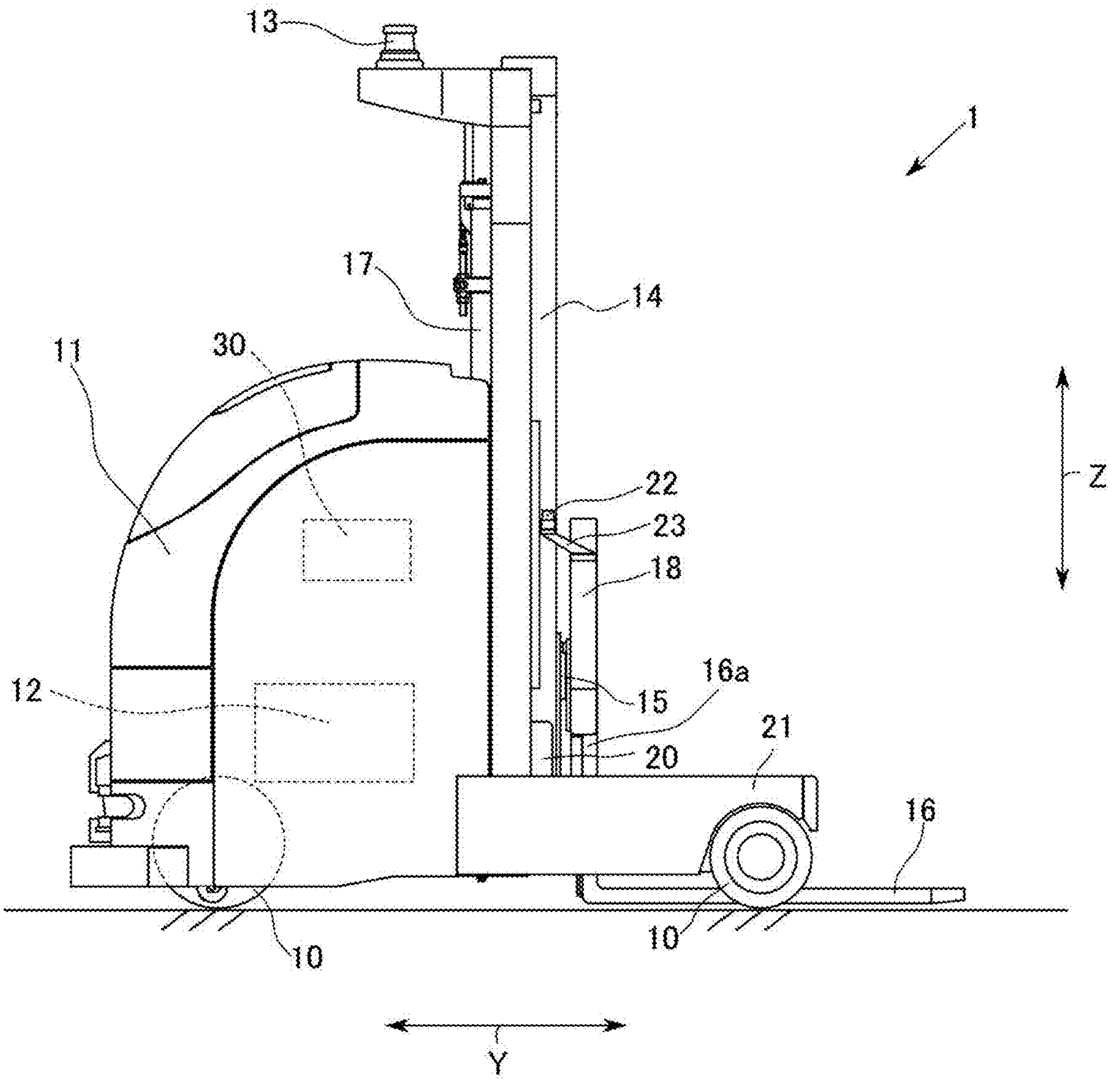
FIG. 1 is a side view of the cargo handling vehicle according to an embodiment of the disclosure.

Hereinafter, an embodiment of a transport vehicle, a connecting part, a distance specifying method, and a distance specifying program according to the disclosure will be described with reference to the accompanying drawings. In the drawings, a double-headed arrow X indicates the left-right direction, a double-headed arrow Y indicates the front-rear direction, and a double-headed arrow Z indicates the up-down direction.

Figure 2:
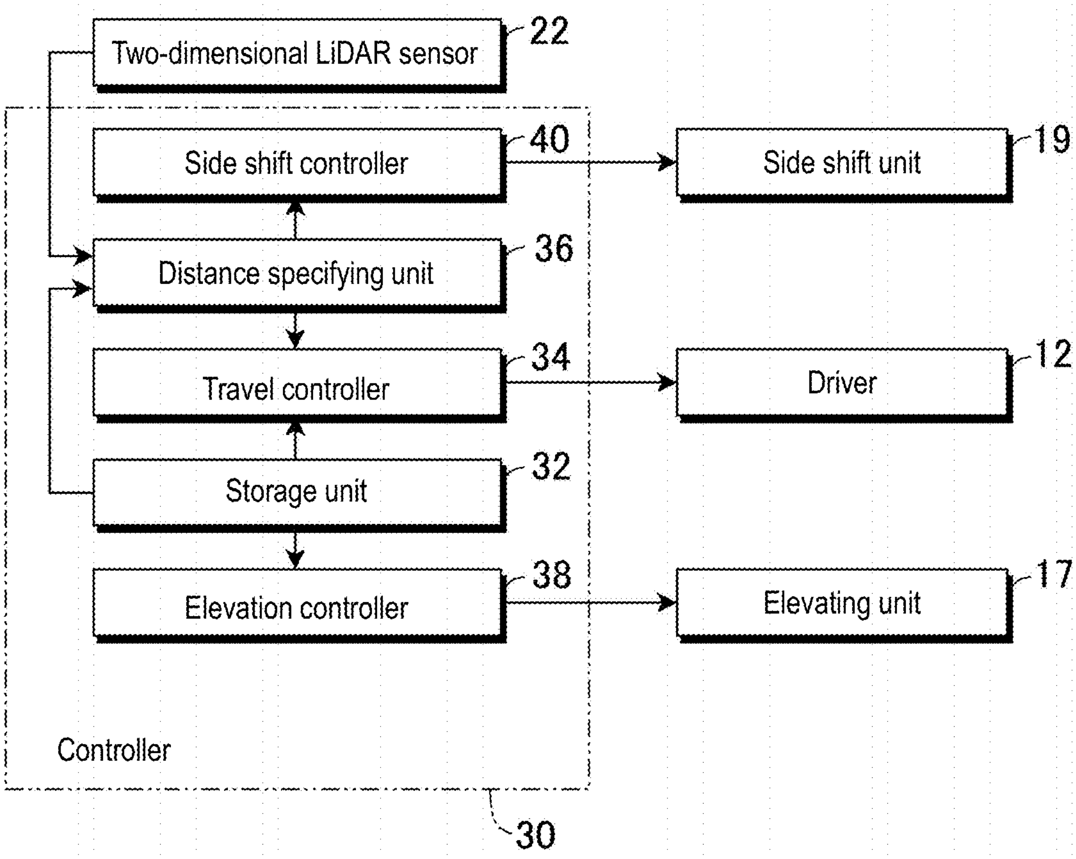
FIG. 2 is a functional block diagram of the controller.
Figure 3A:
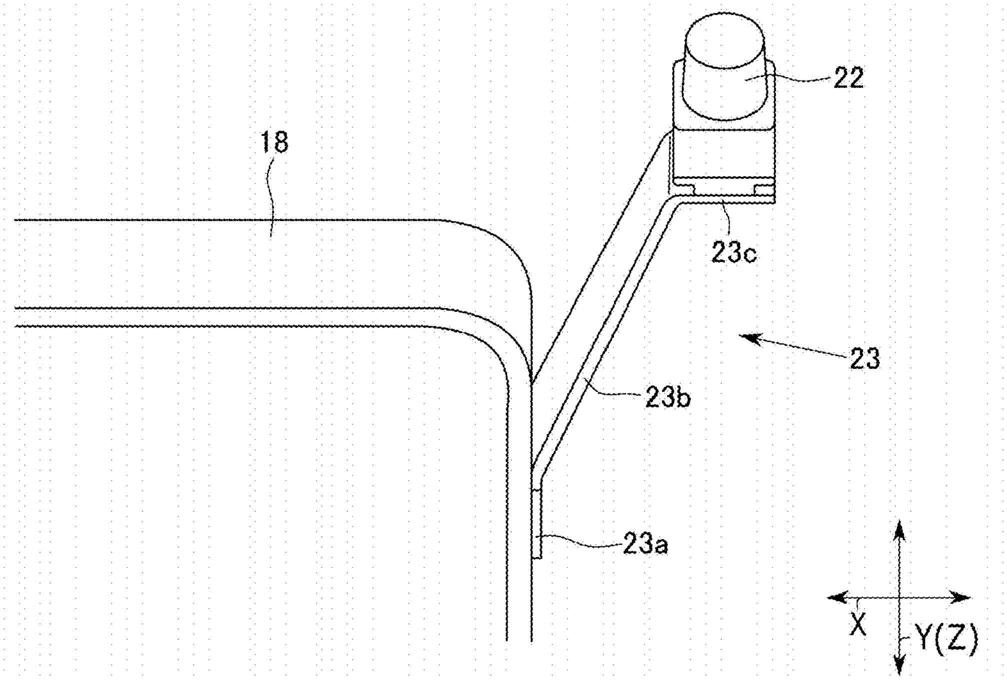
Figure 3B:
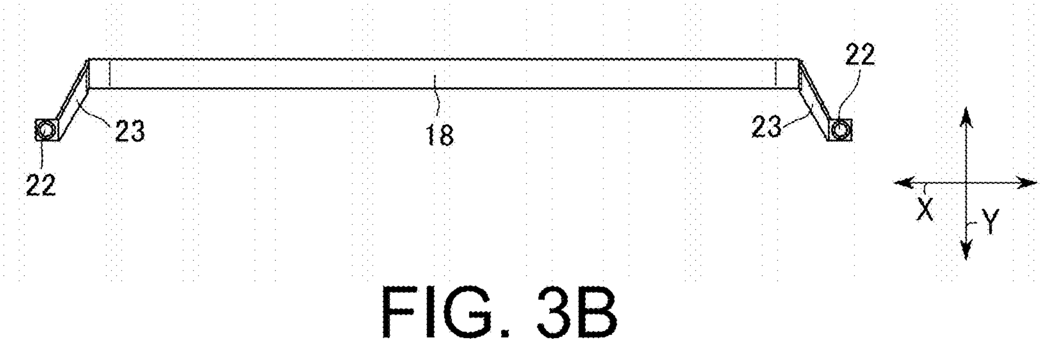
Figure 3C:
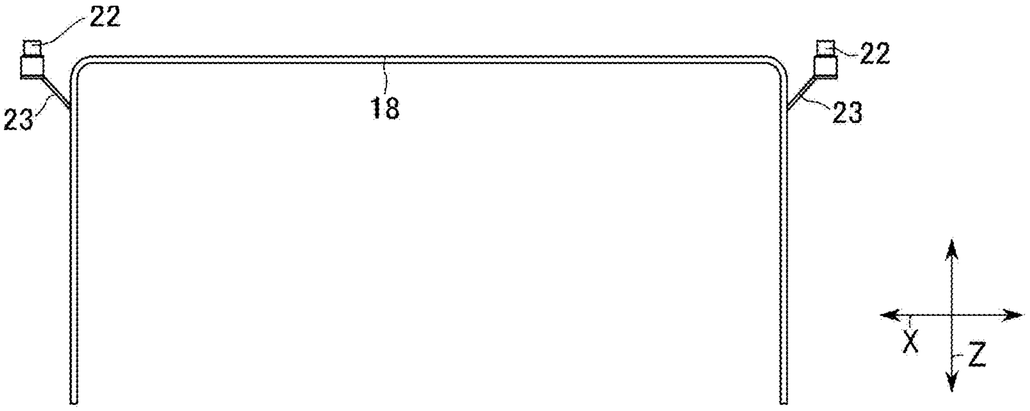

FIG. 1 is a side view of the transport vehicle 1 according to this embodiment, and FIG. 2 is a functional block diagram of a controller 30. The transport vehicle 1 according to this embodiment is an unmanned guided vehicle that autonomously travels and handles cargo, but this is merely an example, and the transport vehicle 1 according to the disclosure is not limited thereto. For example, the transport vehicle 1 may be a manned/unmanned transport vehicle 1.

As shown in FIG. 1 and FIG. 2, the transport vehicle 1 includes a plurality of wheels 10, a vehicle body 11, a driver 12, a laser scanner 13, left and right masts 14, a lift bracket 15, left and right forks 16, an elevating unit 17, a backrest 18, a side shift unit 19, left and right carriages 20, left and right reach legs 21, left and right two-dimensional LiDAR sensors 22, left and right connecting parts 23, and the controller 30. Although the transport vehicle 1 is a reach-type forklift, this is merely an example, and the transport vehicle 1 according to the disclosure may be a counter-type forklift.

The vehicle body 11 is arranged on the wheels 10, and the driver 12 is arranged inside the vehicle body 11. The driver 12 is configured to rotate and stop the wheels 10.

The laser scanner 13 is arranged above the vehicle body 11, and rotates horizontally to emit a laser. Then, the laser scanner 13 specifies the position of a reflector arranged in the facility by scanning the reflected light of the laser, so as to specify the current position of the transport vehicle 1.

The left and right masts 14 extend vertically and are arranged in front of the vehicle body 11. The lift bracket 15 has finger bars for fixing the left and right forks 16, and is configured to be raised and lowered along the left and right masts 14 by the elevating unit 17. The left and right forks 16 correspond to the "cargo loading unit" of the disclosure. In this embodiment, the number of forks 16 is four, but may be two or six and is not particularly limited. The transport vehicle 1 is equipped with four forks 16, so as to scoop up two pallets (cargo) at the same time.

The backrest 18 is formed in the shape of a frame, and is configured to extend vertically and horizontally and receive the loaded cargo W1. For the backrest 18 shown in FIG. 3A to FIG. 3C and FIG. 5, only the outer frame is shown, and the outer frame is arranged outside the forks 16 in the left-right direction.

The side shift unit 19 has an actuator, and is configured to move the backrest 18 together with the forks 16 in the left-right direction by the actuator. Thus, the side shift unit 19 is capable of adjusting the position of the fork 16 in the left-right direction with respect to the fork insertion hole of the pallet and adjusting the position for loading the cargo W1. The actuator may be a hydraulic actuator or an electric actuator, and is not particularly limited.

The left and right carriages 20 are provided outside the left and right masts 14 respectively, and the left and right reach legs 21 extend forward from the vehicle body 11. Guides for guiding the carriages 20 are provided inside the left and right reach legs 21, and the mast 14 is moved together with the carriage 20 to an advanced position or a retracted position by a reach cylinder (not shown).

The left and right two-dimensional LiDAR sensors 22 are configured by laser scanners, and are configured to be capable of irradiating a laser while rotating in the horizontal direction and scanning the reflected light of the laser to acquire the distances to the surrounding objects of the two-dimensional LiDAR sensors 22 by a point group PG. The two-dimensional LiDAR sensor 22 corresponds to the "point group acquisition unit" of the disclosure. For example, instead of the two-dimensional LiDAR sensor 22, the point group acquisition unit may be a three-dimensional LiDAR sensor or a three-dimensional ToF (Time of Flight) camera, and is not limited to a two-dimensional LiDAR sensor.

As shown in FIG. 1 and FIG. 3A to FIG. 3C, the left and right connecting parts 23 have first end portions 23*a*, intermediate portions 23*b*, and second end portions 23*c*.

The first end portions 23*a* are fixed to the left and right ends of the backrest 18, and the intermediate portion 23*b* extends obliquely behind the backrest 18 from the first end portion 23*a* in plan view. The second end portion 23*c* has a horizontal surface continuous from the intermediate portion 23*b*, and supports the two-dimensional LiDAR sensor 22 with the horizontal surface.

The length of the intermediate portion 23*b* is configured such that the two-dimensional LiDAR sensor 22 supported by the second end portion 23*c* is positioned outside the side surface of the cargo loaded on the forks 16. That is, if the width of the backrest 18 is narrow and the cargo protrudes greatly from the backrest 18 to the left and right, the length of the intermediate portion 23*b* is lengthened accordingly.

Figure 4:
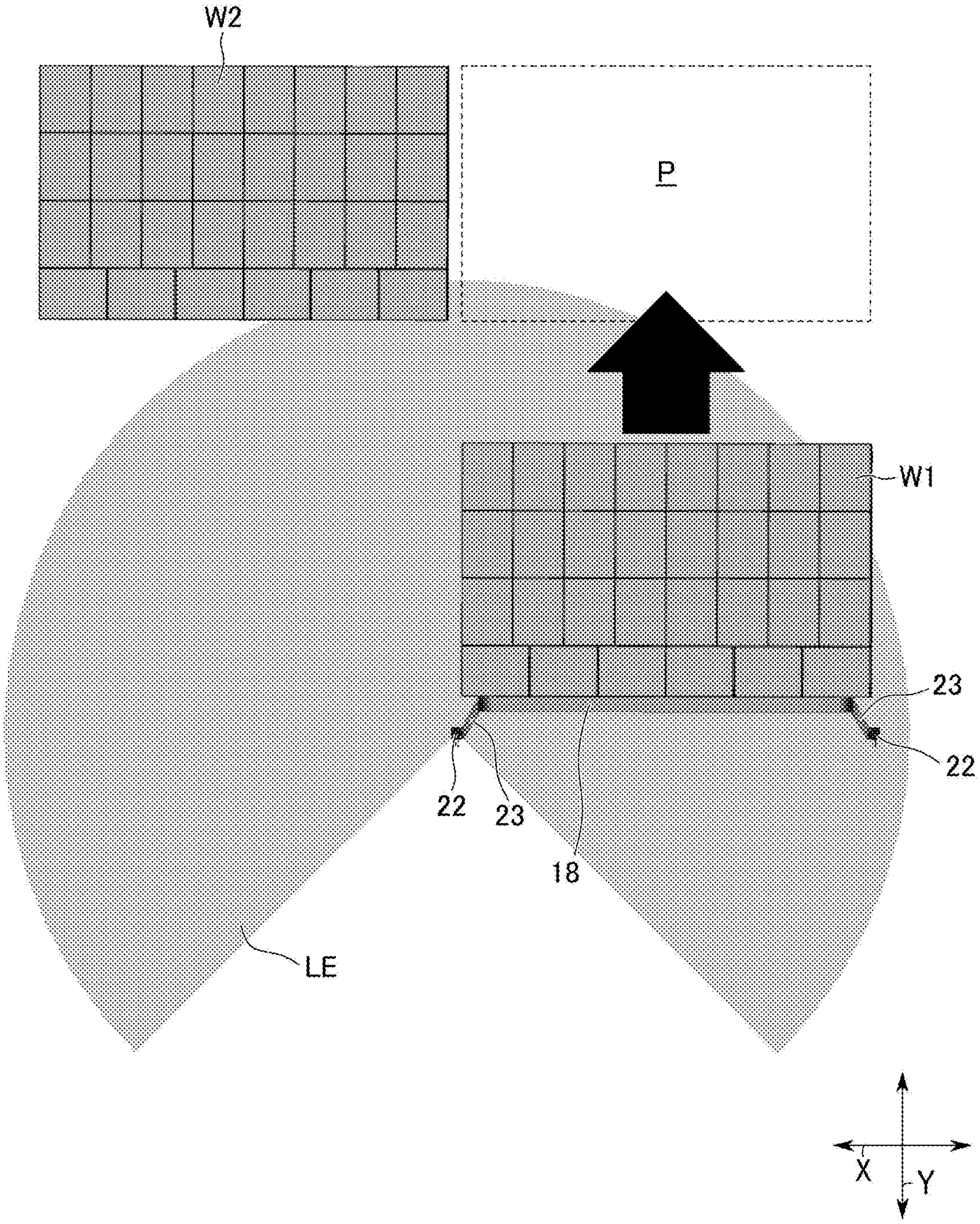
FIG. 4 is a plan view showing laser irradiation of the two-dimensional LiDAR sensor.
Figure 5:
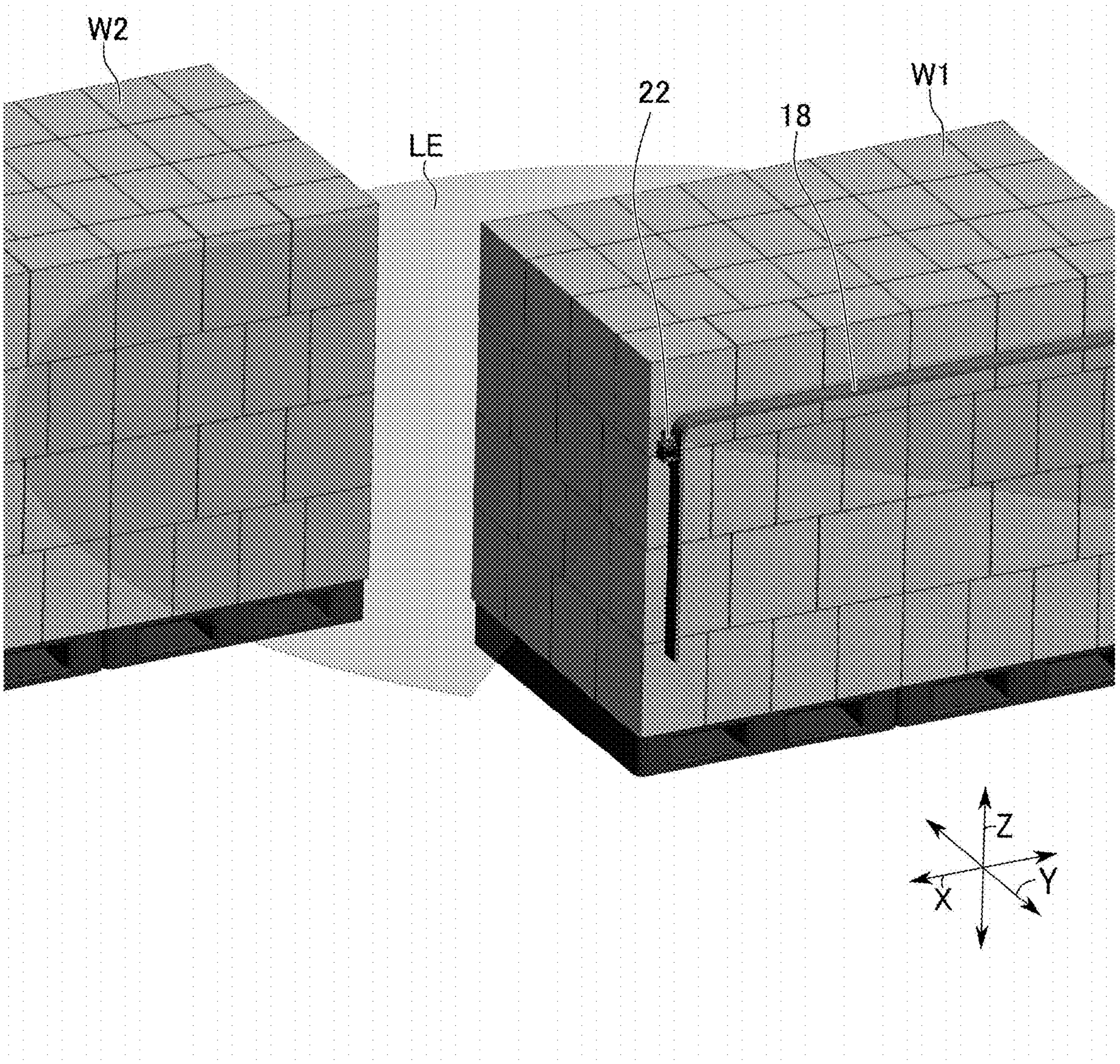
FIG. 5 is a perspective view showing laser irradiation of the two-dimensional LiDAR sensor.

FIG. 4 is a plan view showing a laser irradiation range LE of the two-dimensional LiDAR sensor 22, and FIG. 5 is a perspective view showing the laser irradiation range LE of the two-dimensional LiDAR sensor 22. Further, FIG. 4 and FIG. 5 show the cargo W1 loaded on the forks 16 and the cargo W2 loaded adjacent to a cargo loading position P in front of the cargo W1. The cargo loading position P is, for example, a predetermined loading position of a mobile shelf included in a cargo handling schedule, a predetermined loading position of a loading platform of a truck T, or the like.

As shown in FIG. 4 and FIG. 5, the two-dimensional LiDAR sensor 22 is arranged at a position to be capable of horizontally irradiating the cargo W1 loaded on the forks 16 and the cargo loading position P with a laser. Then, the two-dimensional LiDAR sensor 22 acquires the distance to the object for each irradiation angle by irradiating the laser while rotating horizontally and receiving the reflected light. This distance data is acquired as the point group PG.

Figure 6A:
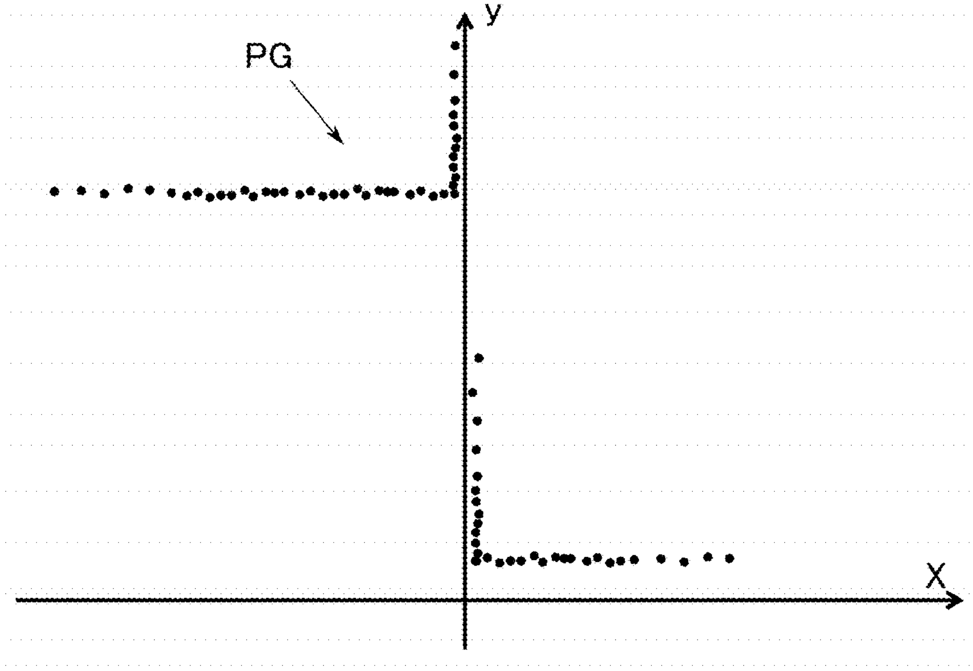
FIG. 6A is a diagram showing the point group acquired by the two-dimensional LiDAR sensor on the left side.

FIG. 6A is a diagram showing the point group PG acquired by the two-dimensional LiDAR sensor 22 on the left side. The X-axis in FIG. 6A and FIG. 6B indicates the distance in the left-right direction and the Y-axis in FIG. 6A and FIG. 6C indicates the distance in the front-rear direction, and the intersection (origin) of the X-axis and the Y-axis indicates the position of the two-dimensional LiDAR sensor 22. In addition, the point group PG in the attached drawings is an image diagram for showing an example of the acquired point group PG, and is not the point group PG actually acquired. As shown in FIG. 6A, the point group PG is acquired along the end surfaces of the cargo W1 loaded on the forks 16 and the cargo W2 loaded adjacent to the cargo loading position P.

As shown in FIG. 1, the controller 30 is arranged inside the vehicle body 11. The controller 30 is configured by a computer having a storage device, an arithmetic unit, and a memory. The storage device stores a distance specifying program that causes the computer to operate as a distance specifying unit 36 of the disclosure.

As shown in FIG. 2, the controller 30 includes a storage unit 32, a travel controller 34, the distance specifying unit 36, an elevation controller 38, and a side shift controller 40.

A cargo handling schedule is stored in the storage unit 32, and the cargo loading position P is included in the cargo handling schedule. The storage unit 32 also includes the positions of the left and right two-dimensional LiDAR sensors 22 and the distance from the retracted position to the advanced position of the mast 14.

The travel controller 34 is configured to control the driver 12, and causes the transport vehicle 1 to travel to the cargo loading position P with reference to the cargo loading position P stored in the storage unit 32 and the current position acquired by the laser scanner 13.

Based on the acquired point group PG, the distance specifying unit 36 specifies a distance D1 in the left-right direction and a distance D2 in the front-rear direction between the cargo W1 loaded on the forks 16 and the object adjacent to the cargo loading position P. A method of analyzing the point group PG performed by the distance specifying unit 36 is not particularly limited.

The travel controller 34 may calculate a forward distance required for unloading based on the distances D1 and D2 between the cargo W1 and the object adjacent to the cargo loading position P, the distance from the retracted position to the advanced position of the mast 14, and the current position of the transport vehicle 1, and cause the transport vehicle 1 to advance based on the calculated distance.

The elevation controller 38 is configured to control the elevating unit 17, and raises and lowers the forks 16 by the elevating unit 17 based on the cargo loading position P stored in the storage unit 32.

The side shift controller 40 is configured to control the side shift unit 19, and moves the cargo W1 close to or away from the object adjacent to the cargo loading position P by the side shift unit 19 based on the distance D1 in the left-right direction between the cargo W1 loaded on the forks 16 and the object adjacent to the cargo loading position P, which is specified by the distance specifying unit 36. Thus, it is possible to load the cargo W1 with a closed space between the cargo W1 and the cargo W2 and to avoid a state where the cargo W1 overlaps.

Figure 6C:
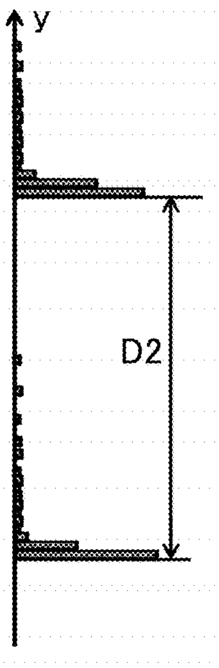
FIG. 6C is a diagram in which the point group of FIG. 6A is displayed as a histogram in the front-rear direction.
Figure 6B:
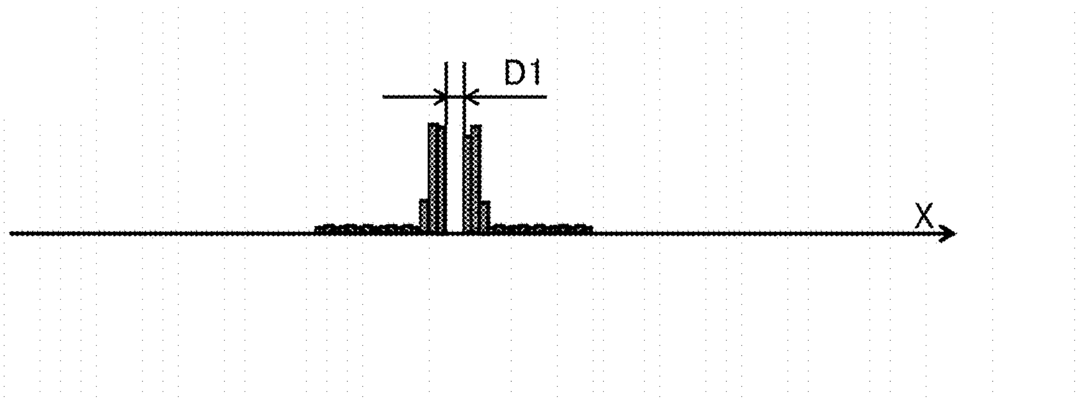
FIG. 6B is a diagram in which the point group of FIG. 6A is displayed as a histogram in the left-right direction.

Next, the method by which the distance specifying unit 36 specifies the distance D1 in the left-right direction between the cargo W1 and the cargo W2 will be described with reference to FIG. 6A to FIG. 6C. FIG. 6B and FIG. 6C show the point group PG of FIG. 6A as histograms in the left-right direction and the up-down direction.

As shown in FIG. 6B, according to the frequency distribution on the X-axis, there is a range with no distribution in the middle. This range indicates areas where reflection of the laser received by the two-dimensional LiDAR sensor 22 is extremely low or unavailable compared to other areas. Therefore, the distance specifying unit 36 is able to specify the area with no reflection of the laser using the frequency distribution, and calculate the length D1 of the area to specify the distance D1 between the side surface of the cargo W1 and the side surface of the cargo W2.

Furthermore, as shown in FIG. 6C, according to the frequency distribution on the Y-axis, it can be seen that there are two peak values on the upper side and the lower side. Accordingly, the distance specifying unit 36 is able to specify the distance D2 between the front surface of the cargo W1 and the front surface of the cargo W2 by calculating the distance D2 between the two peak values. Alternatively, it can be seen that there is a boundary between the lower side of the peak value on the upper side and the lower side of the peak value on the lower side where the distribution of the point group PG disappears. Therefore, the distance specifying unit 36 is able to specify the distance D2 between the front surface of the cargo W1 and the front surface of the cargo W2 by calculating the distance between these boundaries.

In this way, the distance specifying unit 36 is able to analyze the point group PG acquired by the two-dimensional LiDAR sensor 22 using the frequency distribution to specify the distance D1 in the left-right direction and the distance D2 in the front-rear direction between the cargo W1 and the object adjacent to the cargo loading position P. Since the transport vehicle 1 is capable of correcting the cargo loading position P afterward even if the mobile shelf, the truck T, or the like deviates from the predetermined position, it is possible to load the cargo W1 at an appropriate position. The histograms of FIG. 6B and FIG. 6C are for illustrating the frequency distribution in this specification, and there is no particular need for the distance specifying unit 36 to create histograms.

FIG. 7A to FIG. 10C show examples of the information that the distance specifying unit 36 can acquire by frequency distribution analysis.

Figure 7A:
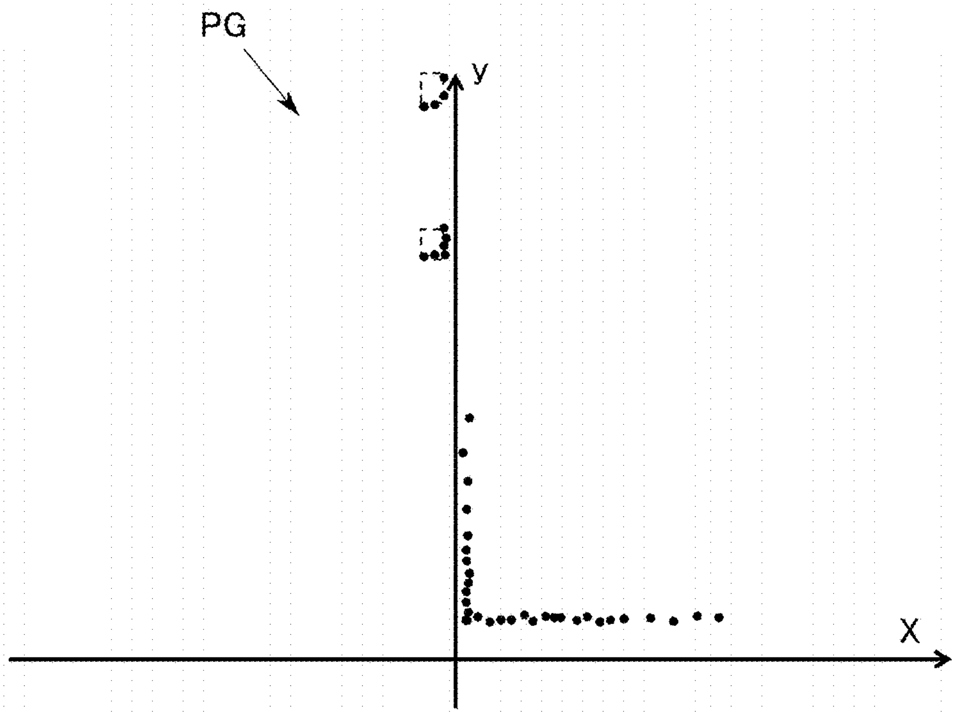
FIG. 7A is a diagram showing another point group acquired by the two-dimensional LiDAR sensor on the left side.
Figure 7C:
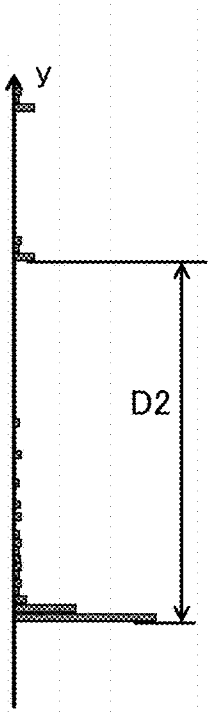
FIG. 7C is a diagram in which the point group of FIG. 7A is displayed as a histogram in the front-rear direction.
Figure 7B:
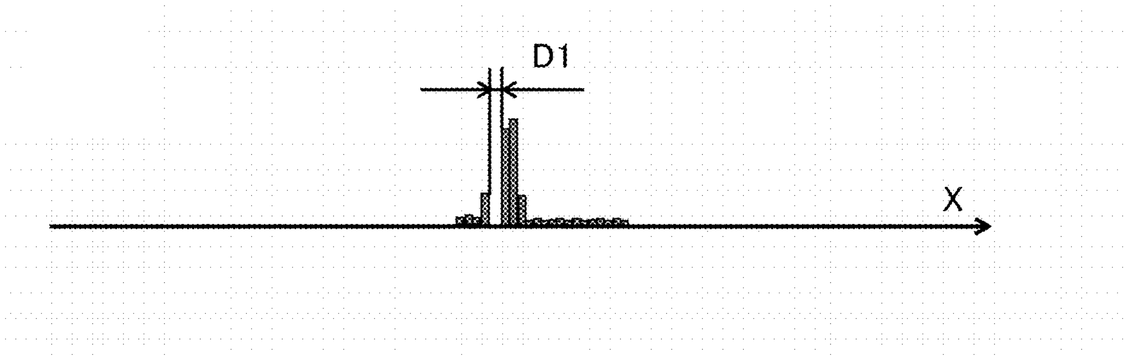
FIG. 7B is a diagram in which the point group of FIG. 7A is displayed as a histogram in the left-right direction.

FIG. 7A shows the point group PG acquired by the two-dimensional LiDAR sensor 22 when the cargo loading position P is a frame-shaped rack. The left side of FIG. 7A shows two point groups PG acquired by irradiating two frames with a laser. In addition, FIG. 7B and FIG. 7C show the acquired point groups PG by histograms in the left-right direction and the up-down direction. The distance specifying unit 36 specifies the distance D1 between the side surface of the frame and the side surface of the cargo W1 by calculating the length of the area with no reflection of the laser by the same method as described above. Further, the distance specifying unit 36 specifies the distance between the front surface of the frame and the front surface of the cargo W1 by calculating the distance D2 between the upper and lower two peak values by the same method as described above.

Figure 8A:
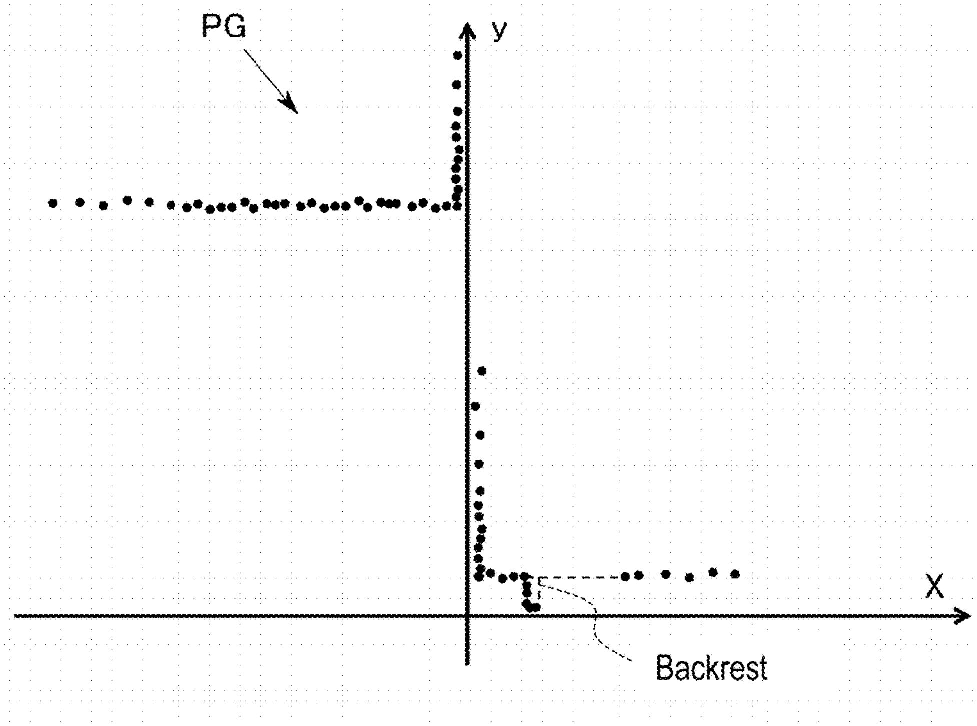
FIG. 8A is a diagram showing yet another point group acquired by the two-dimensional LiDAR sensor on the left side.
Figure 8C:
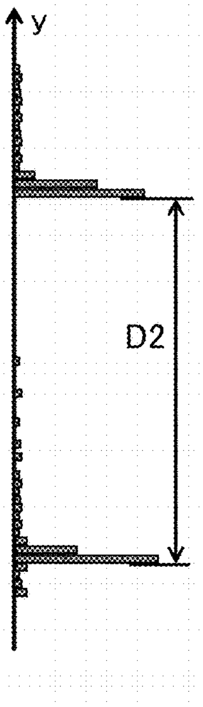
FIG. 8C is a diagram in which the point group of FIG. 8A is displayed as a histogram in the front-rear direction.
Figure 8B:
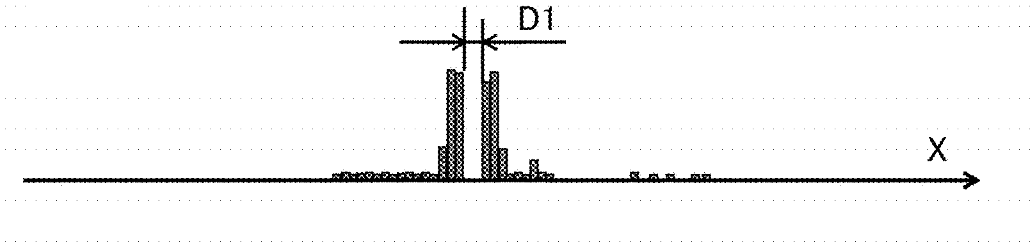
FIG. 8B is a diagram in which the point group of FIG. 8A is displayed as a histogram in the left-right direction.

In addition, FIG. 8A shows the point group PG acquired by the two-dimensional LiDAR sensor 22 when the position of the two-dimensional LiDAR sensor 22 is arranged at the center of the height of the backrest 18. The right side of FIG. 8A shows the point group PG acquired by reflection of the laser to the end portion of the backrest 18. However, even in this case, it is still possible to specify the area with no reflection of the laser in the center in the left-right direction by analyzing using the frequency distribution, as shown in FIG. 8B and FIG. 8C, and it is possible to specify the peak on the upper side and the peak on the lower side in the up-down direction. Thus, the distance specifying unit 36 is capable of specifying the distances D1 and D2 by the same method.

Figure 9A:
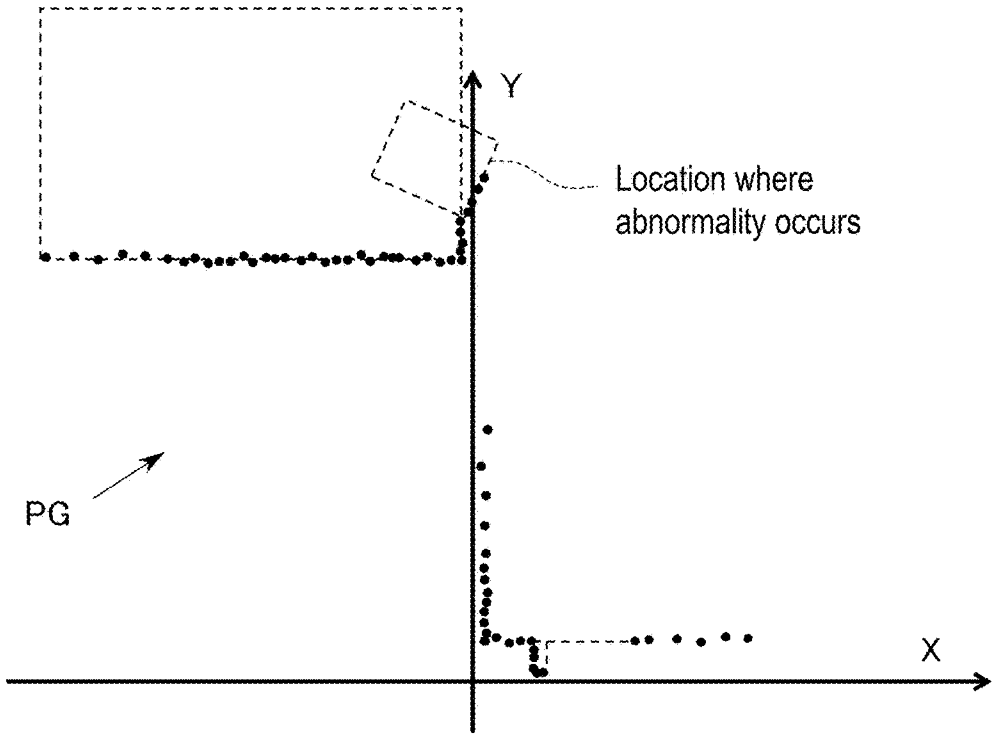
FIG. 9A is a diagram showing yet another point group acquired by the two-dimensional LiDAR sensor on the left side.
Figure 9C:
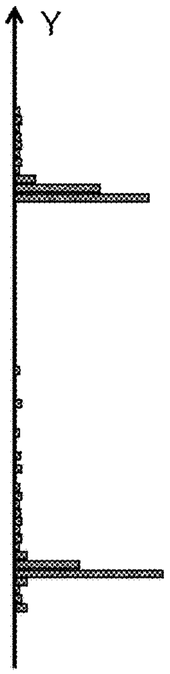
FIG. 9C is a diagram in which the point group of FIG. 9A is displayed as a histogram in the front-rear direction.
Figure 9B:
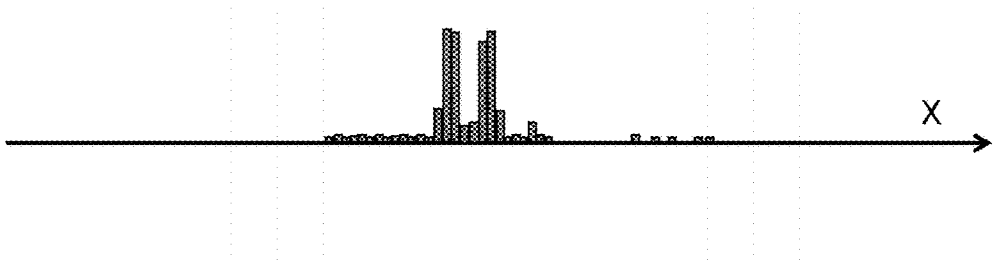
FIG. 9B is a diagram in which the point group of FIG. 9A is displayed as a histogram in the left-right direction.

Further, FIG. 9A shows the point group PG acquired by the two-dimensional LiDAR sensor 22 when there is an abnormality in the loading destination space, such as collapse of cargo. The upper side of FIG. 9A shows the point group PG acquired by reflection of the laser to the location where the abnormality occurs. In this case, as shown in FIG. 9B, it is possible to specify that there is no area with no distribution in the center in the left-right direction by analyzing using the frequency distribution. In this way, by analyzing using the frequency distribution, the distance specifying unit 36 is capable of specifying that there is no gap between the cargo W1 and the cargo W2, specifically, there is no area with no reflection of the laser between the peak value on the left side and the peak value on the right side. Thereby, the distance specifying unit 36 is capable of recognizing that there is an abnormality in the loading destination space. In this case, the controller 30 may stop the cargo handling operation of the transport vehicle 1.

Figure 10A:
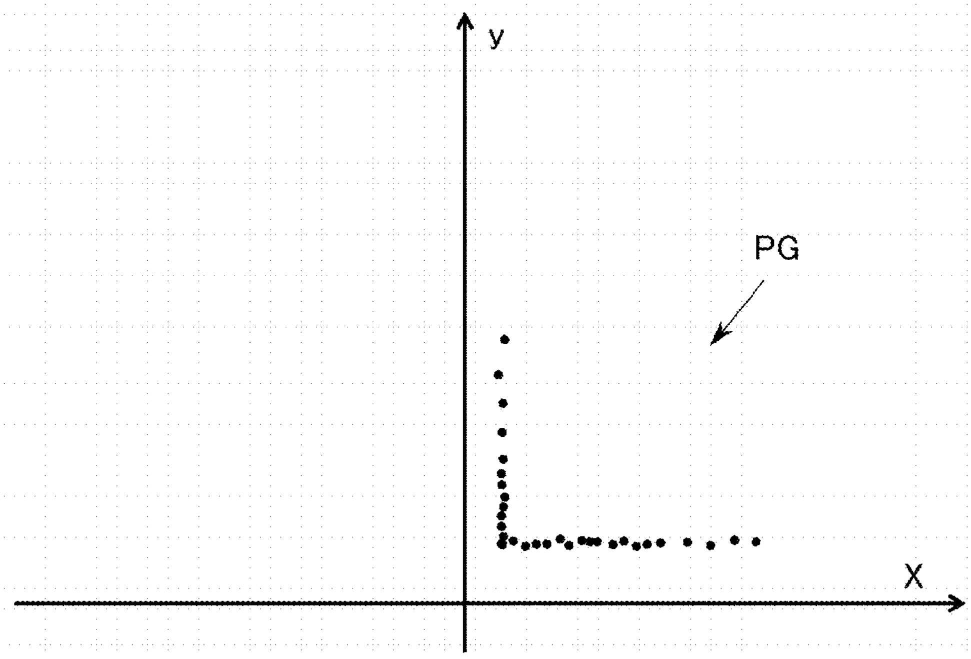
FIG. 10A is a diagram showing yet another point group acquired by the two-dimensional LiDAR sensor on the left side.
Figure 10C:
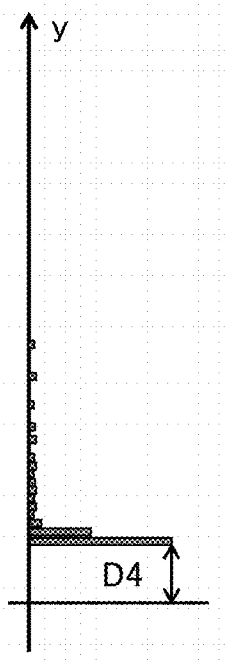
FIG. 10C is a diagram in which the point group of FIG. 10A is displayed as a histogram in the front-rear direction.
Figure 10B:
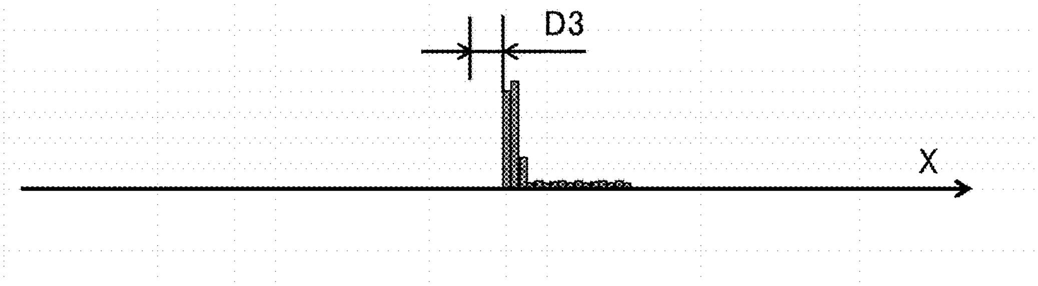
FIG. 10B is a diagram in which the point group of FIG. 10A is displayed as a histogram in the left-right direction.

FIG. 10A shows the point group PG acquired by irradiating only the cargo W1 with a laser by the two-dimensional LiDAR sensor 22. As shown in FIG. 10B and FIG. 10C, the distance specifying unit 36 specifies the area from the two-dimensional LiDAR sensor 22 (origin) to the area with the distribution or the area to the peak value by analyzing the point group PG data using the frequency distribution. Thereby, the distance specifying unit 36 is also capable of calculating a distance D3 in the left-right direction and a distance D4 in the front-rear direction between the two-dimensional LiDAR sensor 22 and the cargo W1 by calculating the distances D3 and D4 of the specified area.

In the analysis using a LiDAR sensor, conventionally the distance between a surrounding object and the LiDAR sensor is specified by comparing and matching the shape and features of the object that has been specified in advance with the acquired point group PG. For this method, it is difficult to stably acquire the distance to the surrounding object when the unloading destination is a thin frame-shaped structure, when the surrounding structure including the backrest 18 is detected by the LiDAR sensor, or when there is an abnormality in the loading destination space.

Besides, since the conventional analysis using a LiDAR sensor adopts a method of recognizing the shape and features of an object that has been specified in advance, the position of the LiDAR sensor is adjusted so as to irradiate the cargo W1 with a laser and not block the laser. Therefore, with the conventional method, it is not possible to acquire the mutual positional relationship among the transport vehicle 1, the cargo W1, and the object adjacent to the cargo loading position P by only the LiDAR sensor. Thus, for the conventional method, it is necessary to separately perform other distance measurement, interference confirmation, etc., and for these purposes, it is necessary to separately arrange other sensors.

In contrast, according to the method of the disclosure, it is possible to acquire the mutual positional relationship among the transport vehicle 1, the loaded cargo W1, and the object or cargo W2 adjacent to the cargo loading position P using only the left and right two-dimensional LiDAR sensors 22. Moreover, according to the method of the disclosure, it is possible to constantly and stably acquire the distance between the cargo W1 and the cargo W2 even when the unloading destination is a thin frame-shaped structure, when the surrounding structure including the backrest 18 is detected by the two-dimensional LiDAR sensor 22, or when there is an abnormality in the loading destination space.

Next, an example of a series of operations of the transport vehicle 1 according to the disclosure will be described with reference to FIG. 11A to FIG. 12C. In this description, the transport vehicle 1 in FIG. 11A to FIG. 12C is assumed to be a counter-type forklift. Thus, it is assumed that the position of the mast 14 in the front-rear direction does not move.

Figure 11A:
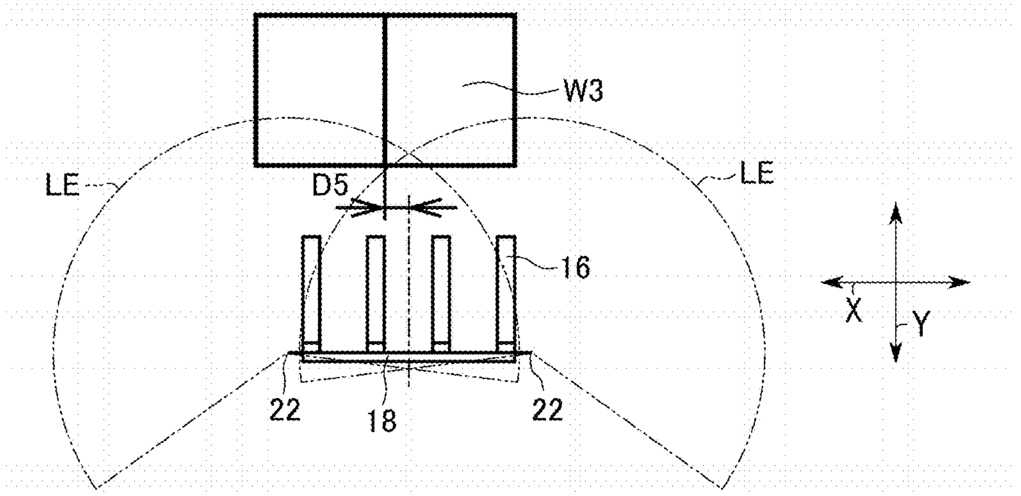
FIG. 11A, FIG. 11B, and FIG. 11C are views respectively showing a series of operations of the transport vehicle.

(1) (1-1) As shown in FIG. 11A, before the transport vehicle 1 scoops up the cargo W3, the left and right two-dimensional LiDAR sensors 22 irradiate the cargo W3 with lasers.

(1-2) Next, the transport vehicle 1 analyzes the acquired point group PG by the distance specifying unit 36 using the frequency distribution to specify the positions of the left and right ends of the cargo W3 and the position of the center of the cargo W3 in the left-right direction.

(1-3) Next, the transport vehicle 1 calculates the distance D5 between the position of the center of the cargo W3 in the left-right direction and the position of the center of the backrest 18 in the left-right direction by the distance specifying unit 36.

(1-4) Furthermore, based on the calculated distance D5, the transport vehicle 1 moves the forks 16 in the left-right direction by the side shift unit 19, thereby correcting the center deviation between the forks 16 and the cargo W3.

For example, when the transport vehicle 1 is a side fork vehicle, the transport vehicle 1 is capable of correcting the center deviation between the forks 16 and the cargo W3 by moving the vehicle body 11 by the travel controller 34 based on the specified distance D5.

Figure 11B:
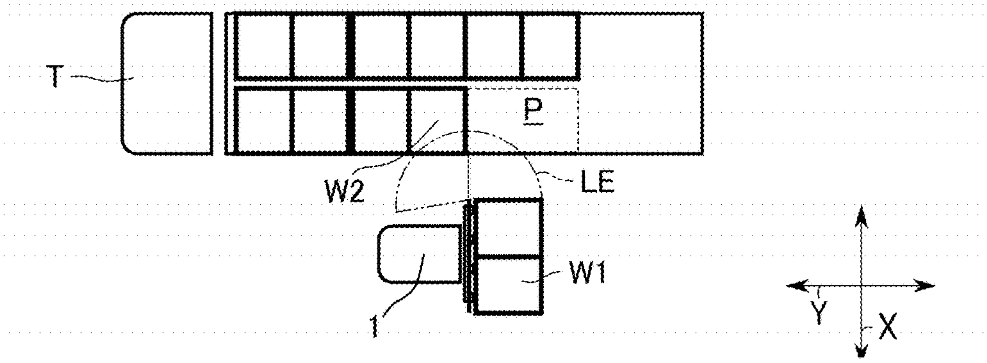

(2) (2-1) Next, the transport vehicle 1 scoops up the cargo W3 (W1) and transports it to the truck T, and as shown in FIG. 11B, travels in parallel to the loading platform of the truck T while irradiating the loading platform of the truck T with a laser by the two-dimensional LiDAR sensor 22 on the side of the truck T.

(2-2) Next, the transport vehicle 1 analyzes the acquired point group PG by the distance specifying unit 36 using the frequency distribution to detect the side surface of the object (cargo W2) adjacent to the cargo loading position P on the loading platform, and specify the mutual positional relationship among the position of the detected side surface, the position of the two-dimensional LiDAR sensor 22, and the position of the cargo W1.

(2-3) Next, when detecting the side surface of this object, the transport vehicle 1 changes the direction to the side of the truck T by the travel controller 34 based on the positional relationship among the position of the specified side surface, the position of the two-dimensional LiDAR sensor 22, and the cargo W1.

Figure 11C:
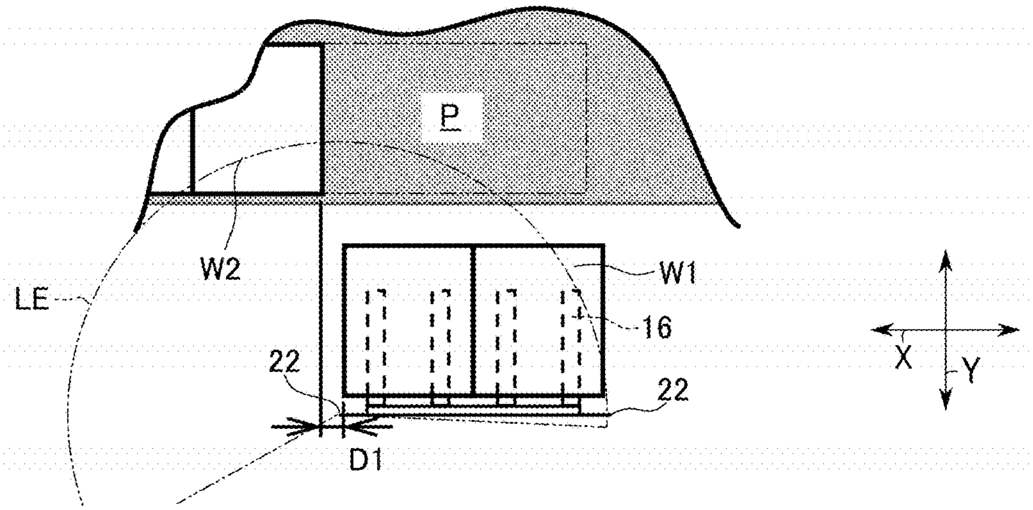

(3) (3-1) Next, as shown in FIG. 11C, before the transport vehicle 1 advances toward the cargo loading position P, the two-dimensional LiDAR sensor 22 irradiates a laser in the horizontal direction.

(3-2) Next, the transport vehicle 1 analyzes the acquired point group PG by the distance specifying unit 36 using the frequency distribution to specify the distance D1 between the cargo W1 and the cargo W2, thereby determining whether the cargo W1 interferes with the cargo W2. At this time, as described above, the transport vehicle 1 may stop cargo handling when specifying that an abnormality has occurred.

(4) (4-1) Next, the transport vehicle 1 advances to the cargo loading position P by the travel controller 34 based on the distance D2 in the front-rear direction between the cargo W1 and the cargo W2 specified by the distance specifying unit 36.

Figure 12A:
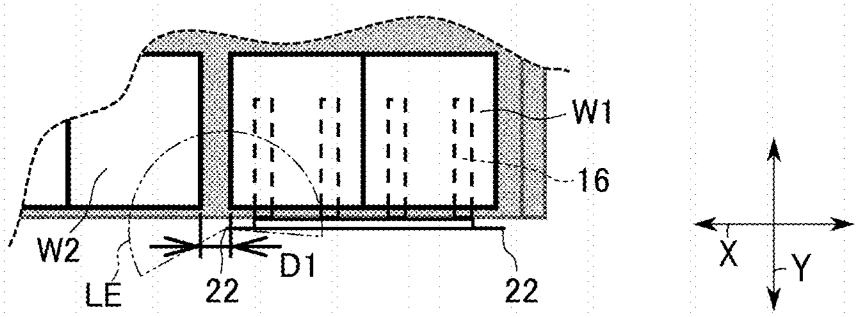
FIG. 12A, FIG. 12B, and FIG. 12C are views respectively further showing a series of operations of the transport vehicle.

(4-2) Next, as shown in FIG. 12A, the transport vehicle 1 irradiates a laser by the two-dimensional LiDAR sensor 22 before unloading the cargo W1.

(4-3) Next, the transport vehicle 1 specifies the distance D1 between the cargo W1 and the cargo W2 by analyzing the acquired point group PG by the distance specifying unit 36 using the frequency distribution.

(4-4) Next, the transport vehicle 1 specifies the control amount of the side shift unit 19 by the side shift controller 40 based on the specified distance D1.

In this way, the transport vehicle 1 is able to appropriately bring the cargo W1 close to the cargo W2 by the side shift unit 19.

Figure 12B:
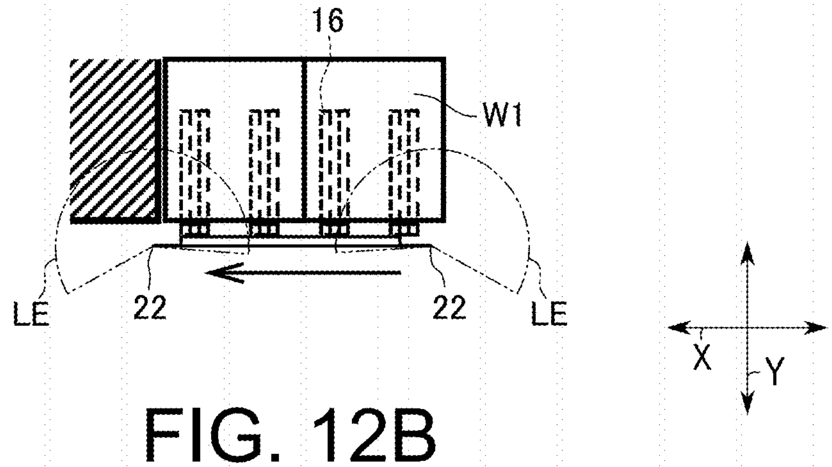

(5) (5-1) Next, as shown in FIG. 12B, the transport vehicle 1 irradiates a laser with the two-dimensional LiDAR sensor 22 when moving the forks 16 to the left by the side shift unit 19.

(5-2) Next, the transport vehicle 1 analyzes the acquired point group PG by the distance specifying unit 36 using the frequency distribution to calculate the distances D3 and D4 in the left-right direction and the front-rear direction between the two-dimensional LiDAR sensor 22 and the cargo W1, and move the forks 16 while specifying the positional relationship between the two-dimensional LiDAR sensor 22 and the cargo W1.

(5-3) At this time, while moving by the side shift unit 19, the transport vehicle 1 determines by the distance specifying unit 36 whether the positional relationship between the two-dimensional LiDAR sensor 22 and the cargo W1 changes.

Thereby, the transport vehicle 1 is able to detect that the cargo W1 starts to slide on the forks 16. Thus, for example, the transport vehicle 1 is able to detect that the cargo W1 is pressed against an object such as the front panel or the rear panel of the truck T, and stop the movement of the forks 16 after this detection to prevent damage to the front panel and the rear panel.

On the other hand, if it is desired to press the cargo W1 against the cargo W2, the transport vehicle 1 may be configured to stop the movement of the side shift unit after detecting that the cargo W1 starts to slide on the forks 16.

Figure 12C:
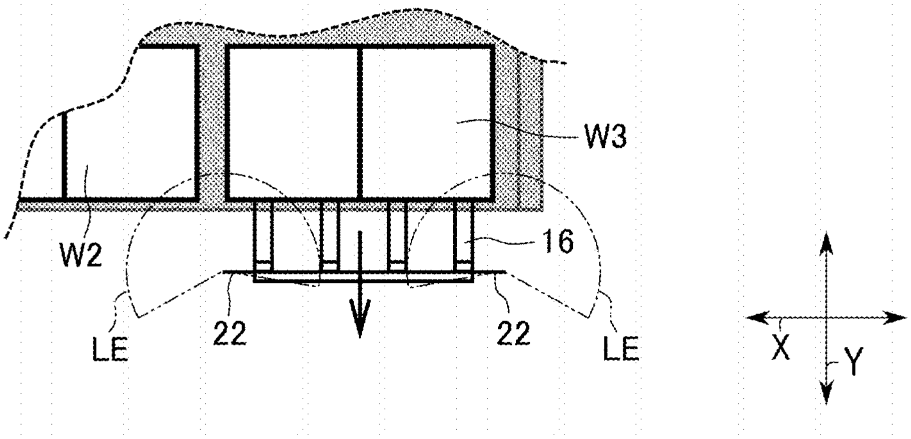

(6) (6-1) Next, as shown in FIG. 12C, the transport vehicle 1 irradiates a laser by the two-dimensional LiDAR sensor 22 when pulling out the forks 16 from the cargo W3.

(6-2) Next, the transport vehicle 1 analyzes the acquired point group PG by the distance specifying unit 36 using the frequency distribution to pull out the forks 16 while specifying the positional relationship between the two-dimensional LiDAR sensor 22 and the cargo W3.

As a result, the transport vehicle 1 detects that the cargo W3 moves together with the forks 16, thereby preventing the cargo W3 from being dragged by the forks 16.

As described above, the two-dimensional LiDAR sensor 22 is arranged at a position to be capable of irradiating the cargo W1 and the cargo loading position P with a laser, making it possible to irradiate the cargo W1 and the object (for example, cargo W2) adjacent to the cargo loading position P with a laser and detect the reflected light from the cargo W1 and the object adjacent to the cargo loading position P to acquire the point group PG. Thus, the transport vehicle is capable of analyzing the acquired point group PG by the distance specifying unit 36 and specifying the distances D1 and D2 between the cargo W1 and the cargo W2, so it is possible to correct the cargo loading position P afterward and appropriately perform cargo handling work even if the mobile shelf, the truck T, or the like deviates from the predetermined position.

Moreover, the storage unit 32 also stores the position of the two-dimensional LiDAR sensor 22, and the distance specifying unit 36 is capable of analyzing the acquired point group PG to specify not only the distances D1 and D2 between the cargo W1 and the cargo W2 but also the distances D3 and D4 between the cargo W1 and the two-dimensional LiDAR sensor 22. That is, the transport vehicle 1 is capable of specifying three relative positional relationships among the cargo W1, the cargo W2, and the two-dimensional LiDAR sensor 22 (transport vehicle 1). As a result, the transport vehicle 1 is capable of performing the series of operations (1) to (6) described above.

Although an embodiment of the transport vehicle, the connecting part, the distance specifying method, and the distance specifying program of the disclosure has been described above, the disclosure is not limited to the above embodiment. For example, the transport vehicle according to the disclosure may be implemented according to the following modified example.

MODIFIED EXAMPLE

The second end portion 23*c* of the connecting part 23 is not necessarily positioned above the backrest 18. In this case, the point group PG acquired by the two-dimensional LiDAR sensor 22 becomes the point group PG shown in FIG. 8A, and as already described, the distance specifying unit 36 is capable of specifying the distance between the cargo W1 and the cargo W2. Further, the first end portion 23*a* of the connecting part 23 may be provided at the upper end of the backrest 18.

The two-dimensional LiDAR sensor 22 may be fixed to the vehicle body 11 and the finger bar, for example, as long as the two-dimensional LiDAR sensor 22 is arranged at a position to be capable of irradiating the cargo W1 loaded on the cargo loading unit 16 and the object adjacent to the cargo loading position P with a laser, or the first end portion 23*a* of the connecting part 23 may be fixed to the side surface (see FIG. 1) of a vertical unit 16*a* of the fork 16, which extends in the up-down direction. Alternatively, the two-dimensional LiDAR sensor 22 may be fixed to the vehicle body 11, the vertical unit 16*a* of the fork 16, and the finger bar via the connecting part.

The cargo loading unit may be configured by a platen instead of the fork 16, for example.

What is claimed is:

1. A transport vehicle, comprising:

a cargo loading unit;

a point group acquisition unit that is arranged at a position to be capable of irradiating cargo loaded on the cargo loading unit and a cargo loading position with a laser, and acquires a point group by horizontally irradiating the laser;

a distance specifying unit that specifies a distance in a left-right direction between the cargo loaded on the cargo loading unit and an object adjacent to the cargo loading position based on the acquired point group;

a backrest; and a connecting part comprising:

a first end portion fixed to either a left or right end portion or an upper end of the backrest;

an intermediate portion extending obliquely behind the backrest from the first end portion in plan view; and a second end portion continuing from the intermediate portion and supporting the point group acquisition unit.

2. The transport vehicle according to claim 1, wherein the transport vehicle is a forklift, and the point group acquisition unit is provided in the backrest.

3. The transport vehicle according to claim 2, wherein the connecting part is connected to the backrest and the point group acquisition unit, and arranges the point group acquisition unit obliquely behind either a left or right end portion of the backrest in plan view.

4. The transport vehicle according to claim 1, wherein the distance specifying unit further specifies a distance in a front-rear direction between the cargo loaded on the cargo loading unit and the object adjacent to the cargo loading position based on the acquired point group.

5. A distance specifying method for specifying a distance in a left-right direction between cargo loaded on a cargo loading unit of a transport vehicle and an object adjacent to a cargo loading position, wherein the transport vehicle comprises a backrest and a connecting part, the connecting portion includes a first end portion fixed to either a left or right end portion or an upper end of the backrest; an intermediate portion extending obliquely behind the backrest from the first end portion in plan view; and a second end portion continuing from the intermediate portion and supporting a LiDAR sensor, the distance specifying method comprising:

acquiring a point group by horizontally irradiating the cargo loaded on the cargo loading unit and the object adjacent to the cargo loading position with a laser emitted by the LiDAR sensor; and specifying the distance in the left-right direction between the cargo loaded on the cargo loading unit and the object adjacent to the cargo loading position based on the acquired point group.

6. A distance specifying method for specifying a distance in a front-rear direction between cargo loaded on a cargo loading unit of a transport vehicle and an object adjacent to a cargo loading position, wherein the transport vehicle comprises a backrest and a connecting part, the connecting portion includes a first end portion fixed to either a left or right end portion or an upper end of the backrest; an intermediate portion extending obliquely behind the backrest from the first end portion in plan view; and a second end portion continuing from the intermediate portion and supporting a LiDAR sensor, the distance specifying method comprising:

acquiring a point group by horizontally irradiating the cargo loaded on the cargo loading unit and the object adjacent to the cargo loading position with a laser emitted by the LiDAR sensor; and specifying the distance in the front-rear direction between the cargo loaded on the cargo loading unit and the object adjacent to the cargo loading position based on the acquired point group.

7. A non-transient computer-readable recording medium, recording a distance specifying program, for a computer of a transport vehicle which comprises:

a cargo loading unit;

a point group acquisition unit that is configured to be capable of horizontally irradiating cargo loaded on the cargo loading unit and a cargo loading position with a laser, and acquires a point group;

a backrest;

a connecting part comprising:

a first end portion fixed to either a left or right end portion or an upper end of the backrest;

an intermediate portion extending obliquely behind the backrest from the first end portion in plan view; and a second end portion continuing from the intermediate portion and supporting the point group acquisition unit; and the computer, to specify a distance between the cargo loaded on the cargo loading unit and an object adjacent to the cargo loading position based on the acquired point group.

* * * * *